(No Model.)
J. SNOW.
BELT FASTENER.
No. 398,857. Patented Mar. 5, 1889.
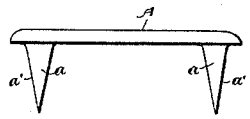
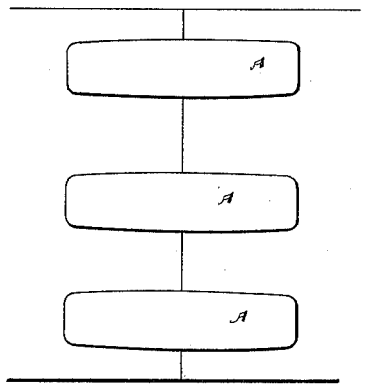
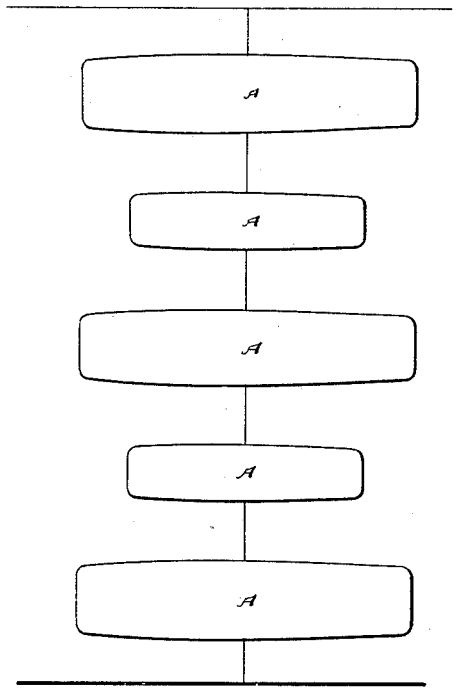
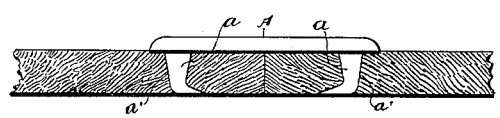
WITNESSES,
James Snow INVENTOR.
By Liggett & Liggett
ATTORNEYS

UNITED STATES PATENT OFFICE.

JAMES SNOW, OF CLEVELAND, OHIO.

BELT-FASTENER.

SPECIFICATION forming part of Letters Patent No. 398,857, dated March 5, 1889.

Application filed October 18, 1888. Serial No. 288,440. (No model.)

*To all whom it may concern:*

Be it known that I, JAMES SNOW, of Cleveland, in the county of Cuyahoga and State of Ohio, have invented certain new and useful Improvements in Belt-Fasteners; and I do hereby declare the following to be a full, clear, and exact description of the invention, such as will enable others skilled in the art to which it pertains to make and use the same.

My invention relates to improvements in belt-fasteners in which a narrow metal bar, usually of malleable cast-iron, flat on the side next the belt, and crowning on the outer side, has near each end thereof a conical tooth for piercing the belt, these teeth having on the outer side flatted surfaces that reduce the points of the teeth to thin cutting-edges adapted to make clean cuts in the belt, such thin points being also easily clinched, whereupon the rounded sides thereof are embedded in the belt without breaking the fiber of the latter and leaving the flatted sides of the teeth from the bend in clinching to the point flush with the surface of the belt, the object being to provide a cheap belt-fastener adapted, by using more or less in number, to fasten any width of belt, leaving the belt when so fastened flexible crosswise, so that it may adapt itself to pulleys more or less crowning.

In the accompanying drawings, Figures 1 and 2 are respectively side and end elevations. Figs. 3 and 4 are plan views showing different manners of applying the fastener. Fig. 5 is an edge view of the belt in section, showing the fasteners clinched.

A represents the body of the fastener, the same being a metal bar, preferably of malleable cast-iron, the bar having a flatted side next the belt, with the outer side convex, or at least with the corners rounded. Bar A is narrow, being usually from three-eighths to a half an inch in width, and, say, from something less than an inch to two inches or more in length, according to circumstances. From the flatted side of the bar project two conical teeth, *a*, the same being located near the respective ends of the bar, as shown, so that the bar has a bearing-surface on the belt outside of the teeth. Each tooth on the outer face—that is, on the face opposite the other tooth—is cut away or flatted, as shown at *a'*, whereby what would otherwise be a round point, difficult to clinch, is converted into a thin cutting-edge, easily clinched, and as the points of the teeth are bent inward in clinching—that is, toward each other—the rounded sides of the teeth are embedded in the belt, but by reason of the rounded surfaces do not break the fiber of the belt. The clinching brings the flattened side of the tooth from the bend to the point outside, and is flush with the surface of the belt, making a smooth surface therewith. Any number of these fasteners may be applied, more or less, according to the width of the belt, and, being narrow and entirely disconnected the one fastener from another, the belt remains flexible crosswise, and may therefore fit crowning pulleys at the splice with the same facility as other parts of the belt.

The fasteners are placed upon the belt astride the joints and the teeth are driven through the belt and clinched, (see Fig. 5,) the operation requiring but a few minutes' time even for a wide belt. The base of the teeth being considerably larger than the cutting-point aforesaid, the fiber is pressed back and packed around the tooth, making firm contact with the latter, and as the draft on the tooth is against the rounded side thereof there is no liability of cutting or tearing the belt by ordinary working strain.

Of course the fasteners are made of different sizes and different lengths of teeth, according to the thickness of the belt.

The different methods of applying the fasteners are shown in Figs. 3 and 4. Where the belt runs over small pulleys, short fasteners, applied as shown in Fig. 3, are preferable.

What I claim is—

A belt-fastener consisting of a narrow metal bar, the same having a flatted and convex side, with a conical tooth located near each end of the bar and projecting from the flatted side thereof, each tooth having a flatted side, substantially as shown, for reducing the point thereof to a thin edge suitable for clinching, substantially as set forth.

In testimony whereof I sign this specification, in the presence of two witnesses, this 1st day of October, 1888.

JAMES SNOW.

Witnesses:
 CHAS. H. DORER,
 ALBERT E. LYNCH.